INVENTOR.
JAMES H. HOLLYDAY
BY Walter V. Wright
AGENT

Oct. 11, 1966 J. H. HOLLYDAY 3,278,049
BALE STACKER

Original Filed June 20, 1963

INVENTOR.
JAMES H. HOLLYDAY
BY Walter V. Wright
AGENT

United States Patent Office 3,278,049
Patented Oct. 11, 1966

3,278,049
BALE STACKER
James H. Hollyday, New Holland, Pa., assignor to Sperry Rand Corporation, New Holland, Pa., a corporation of Delaware
Continuation of application Ser. No. 289,259, June 20, 1963. This application Apr. 21, 1965, Ser. No. 451,684
11 Claims. (Cl. 214—6)

This invention has to do with the art of trucks, or wagons specifically designed for automatically picking up bales of hay from the ground where deposited by hay balers, stacking them on the wagon to form a wagon carried load in the form of a ground stack, and, upon arrival at the destination for the ground stack, erecting the load on end to form the ground stack. Such wagons are now widely used in the West and Southwest and their use is being extended to other portions of the country. This application is a continuation of application Serial No. 289,259, now abandoned.

In making this invention, there have been several very important objects in view. Outstandingly, it has been aimed for the very maximum in simplification, reduction in first cost, lessening of maintenance cost, reduction in weight and adaptation of the mechanism for use with balers of different sizes. Ancillary objects are to increase carrying capacity to render construction in various capacities the more readily achieved, and the more ready adaptation to bales of varying dimensions.

Attainment of the first several and outstanding objects is achieved primarily by reducing the number of hydraulic motors and valves of the hydraulic system utilized to operate the mechanism to a veritable minimum. One hydraulic motor is used, the single control valve for which is the existing control valve of the hydraulic system of the towing vehicle, usually a conventional farm tractor. This single hydraulic motor, or cylinder, operates the vertical stack building mechanism, the mechanism for transferring the completed vertical stacks to the load carrying and ground stack erecting platform, and the mechanism for erecting said platform to form the erected ground stack.

A contributing factor to the general simplification is the method of erecting the vertical stack by initially acting upon the bales received from the ground and laid lengthwise transversely of the vehicle by introducing the successively picked up bales each at the bottom of the stack being builded, growing the stack to full height bale by bale added to its bottom rather than the top and then moving each such stack as vertically completed rearwardly out af the region of its building, that region being located at the very forefront of the load carrying platform. This, of course, requires for the stack per se a space of but one bale width (or thickness as the case may be), leaving the entire remainder of the length of the wagon rearwardly for the load carrying capacity. One has only to choose the number of bales to be carried as constituting a given capacity, and, knowing the base dimension of the ground stack he desires, choose the stack height which meets that condition, whereupon the length of the load carrying platform becomes determinate. Thus, different stacking arrangements are readily made. Adjustment for use with bales of different dimensions are readily made, the width of the transverse stacking section being determined by the width of the bale side to be laid down.

In the accompanying drawings, the best embodiment of this invention is shown. The structure is illustrated in semidiagrammatic form to illustrate and emphasize the general nature and functional relations of the parts.

Figure 1:
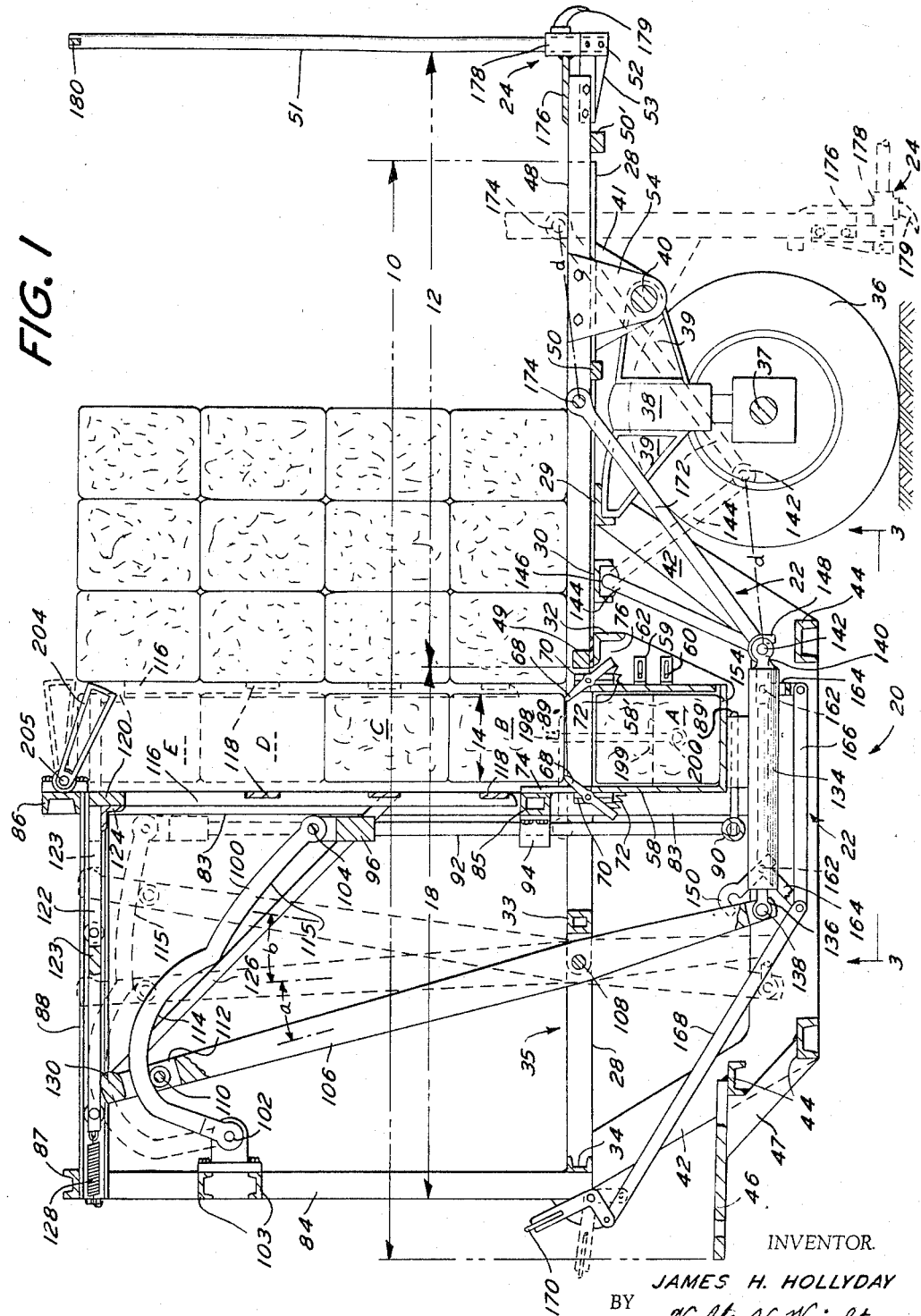
FIG. 1 is a vertical longitudinal sectional view of a wagon taken in the central longitudinal plane of symmetry.

In the drawings, numbers have been assigned to the several different groups of mechanism and applied to lines by headed arrows which points generally to the groups, or generally indicate the longitudinal extent of the regions which they occupy. The wagon chassis or body per se is designated 10, the load carrying and ground stack erecting platform numeral 12, the bale receiving and stacking section 14, the symbolically illustrated pick-up device 16 (FIG. 2), the vertical stack building and transfer mechanism 18, the unitary motor mechanism 20. The ground stack erecting mechanism and the controls of the unit motor utilized by mechanisms 18 and 12 in common, are together designated by numeral 22, an illustrative push-off mechanism by numeral 24, and the hydraulic control system of FIG. 4 by numeral 26.

It is not intended that the present invention be limited to the particularly mechanisms 16 and 24 shown herein. These are merely symbolic indications of means which pick up and deliver bales to the mechanism of this invention and means to free the mechanism of this invention from the completed stacks which it forms and erects. Following is the detailed description of the elements which go to make up these several groups, group by group in the order above set forth, and in the numerical order of the numbers which serially designate their respective parts.

*The trailer or wagon*

The chassis 10 is composed of side rails or sills 28 interconnected by a plurality of cross beams 29, 30, 32, 33 and 34. A chassis front extension 35 provides support for forwardly located parts of several of the mechanisms, support for certain control levers, and space for an operator's seat, should it be desired to have the operator ride the vehicle rather than manipulate its controls from a towing tractor. The chassis is suported for movement over the ground by rearwardly located supporting wheels 36. Wheels 36 are journalled on an axle 37 carried by an axle springing structure 38. Fore-and-aft extending flanged gussets 39 are welded respectively to chassis cross sill 29 and rigid chassis bracing cross shaft 40, and commonly welded to spring housing 38. The rigid cross bracing shaft 40 is of substantial cross section and is rigidly welded to depending flanged brackets 41 having top flange connections welded or bolted to the underside of tre rear portion of side sills 28.

The numeral 42 indicates the generally U-shaped sides of a depending sub-frame whose upper ends are welded to the side sills 28 at cross beams 29 and 34, and designed to afford support for certain mechanical control members of unit motor mechanism 20 and vehicle towing connections. Front and rear cross members 44 extend between the U-shaped sides 42 of the sub-frame. A towing hitch 46 is welded to the upper of the two foremost cross members 44 in its center and extends forwardly therefrom. A bracing gusset 47 for hitch 46 is respectively welded to the hitch and to the centers of the upper and lower front cross member 44 of the sub-frame.

The load carrying and ground stack erecting platform 12

Platform 12 has several longitudinally extending rails 48. Frontal, intermediate and rear cross rails 49, 50 and 50', respectively, are so secured to the longitudinal rails 48 as to constitute the platform an open, but rigid, load carrying unit. Vertical rear end stanchions 51 are supported from the longitudinal rails 48, and together constitute support for that end of the load which is to become the bottom of the ground stack. The stanchions 51 are carried in stanchion sockets 52 having connecting gussets 53 which are bolted to the rails 48. Gussets 54 are bolted onto rails 48 of platform 12 and pivoted upon rigid chassis cross shaft 40. Thus, the main body of the load on platform 12 is supported suitably from chassis sills 28 near their rear ends, while the front end of the load is supported from the chassis through bearing of load platform cross rail 49 upon chassis cross rail 32.

The bale receiving and stacking section 14

A bale receiving and supporting casing 58 depends from the underside of the chassis frame and extends transversely of the chassis. The casing is of rectangular cross section somewhat exceeding in size the transverse cross section of the bales which it is to receive. The casing accommodates below the chassis level two received bales extending longitudinally end to end across the chassis. The casing sides are extended upwardly to different heights, its top and its left hand end are entirely open, while the bottom is closed to support the bales. Its right hand end is provided with a bale stopping half height wall 58' which is carried by the bottom and forward side of the casing and is not connected to the rear wall of the casing. The forward side and bottom of the casing may be formed as an integral unit, but the rear side of the casing is a separate member as may be seen in FIG. 1. A series of four gussets 62 support the casing from the chassis cross beam 32 through welded connections to the bottom of the casing. The rear side of the casing is the shorter of the two sides, its top not reaching to the top of the chassis by a considerable margin. The rear wall of casing 58 is supported on gussets 62 by slotted angle brackets 59 and bolts 60. This enables the rear wall of casing 58 to be readily adjusted forwardly toward the front wall of casing 58 to adapt the mechanism for use with various sizes of hay balers. The front side of the casing is extended several inches above the top of the chassis and is secured by any suitable means to the rear face of cross beam 85 secured to the vertical members 83 of a super-structure frame which carries a number of the elements of the truck stacking and transfer mechanism.

Pairs of slots 66 are provided in casing 58 (FIG. 2) and extend in vertical planes. The slots of each pair are symmetrically located with respect to the center of gravity of the bales successively introduced to the casing. These slots extend all the way from top to bottom of the front wall and across the bottom of the casing substantially to its rear wall and are of a width sufficient to accommodate with adequate clearance, forks 89 of the stacking mechanism in their vertical movement of lifting the bales from casing 58 to and a little above the level of platform 12. The distance between slots 66 and the forks 89 which enter them is sufficiently great to insure that the center of gravity of bales elevated by the forks will lie well inside of them irrespective of the usual difference in length of bales encountered in good baling practice.

Two series of hay dogs 68 with four dogs in each series are supported respectively from the front and rear of the casing and project into the upward path of bales being stacked. The upper ends of dogs 68 are located at such height as to support bales after they are elevated to the level of the top of the chassis by forks 89. Each series is comprised of two pairs of dogs, one pair engaging each bale outwardly of the slots 66 on opposite sides of the center of gravity whereby the bales are substantially symmetrically supported. The details and functionings of various dogs commonly used are so well known that only symbolic illustration is used. Angle brackets 70 are welded to the outer faces of the front and rear walls of bale support casing 58 and served to pivotally mount the dogs 68. Note that fore-and-aft adjustment of the rear wall of casing 58 (FIG. 1) carries the rear series of dogs 68 therewith. Dog springs 72 retain the dogs in projected positions against the bottoms of the slots 74 in the front wall through which they project and against the top of the rear wall over which they project. Observe from FIG. 1 that by making the cross beam 32 of the chassis frame of angular shape and placing it slightly to the rear of the rear wall of casing 58, ample space 76 is provided to give the dogs freedom for operation. When a bale is lifted against their inner ends, they move outwardly of the casing against the pressure of springs 72 to positions alongside their supporting angles 70 and braces 62.

Pick-up mechanism 16

Conventional hay balers eject completed bales onto the ground with the longest dimension of the bale being in the direction of travel of the baler, which is also the direction of travel of the bale stacking wagon of this invention. So far as the present invention is concerned, any conventional bale pick-up mechanism may be used which will engage bales so lying, convey the bales to the height of the bottom of bale receiving casing 58, and turn and deliver the bales transversely into the open end of casing 58. Such mechanism is symbolically indicated at 16 in FIG. 2. It receives its operating power from separate conventional drive means not shown. The pick-up mechanism illustrated has a bottom floor 73. An apron type conveyor 77 travels over floor 73 which should reach substantially to ground level if the bales are to be picked up off the ground. Front and rear side walls 78 and 79 respectively, of the pick-up are spaced apart substantially the width of bale receiving and supporting casing 58. At least the rear wall 79 extends laterally beyond apron conveyor 77 and curves forwardly to receive the end of a bale lying on the ground. Triangular gusset plates 80 are secured in a suitable manner to the respective side walls of casing 58. Hinges 81 connect the front and rear pick-up walls 78 and 79 to the gusset plates 80 and provide for folding the pick-up mechanism to the side of the vehicle during road transport. A bale end and side engaging chain 82 extends over the inside middle of the rear pick-up wall 79 and is inclined downwardly. Chain 82 ends above ground level in a position to be engaged first by the end and then by the side of a bale. The bale is turned by such engagement to move onto apron 77 and so be entered endwise into casing 58. Both the chain 82 and the apron 77 are continuously driven.

Truck stack erecting and transfer mechanism 18

A framework having vertically extending side members 83 and 84 is erected upon the front portion 35 of chassis sills 28. Note that members 83 extend below the chassis for the depth of casing 58 to afford added support therefor and for the pick-up mechanism 16. A transverse frame member 85 is connected between members 83 a few inches above the top of the chassis, while additional transverse frame members 86 and 87 extend between the vertical members 83 and 84 at the top of the frame work. Channel members 88 whose sections face inwardly and whose rear ends open below the top rear cross member 86 are provided at the top of the frame work and extend in the fore-and-aft direction.

The numeral 89 indicates the two pairs of lifting forks above referred to as entering slots 66. Normally they lie immediately below slots 66 in symmetrical relation to the centers of gravity of the bales in casing 58. They extend rearwardly from their support 90 nearly all the way across the width of the casing 58. They must, however, terminate forwardly of the forwardmost position to which the rear wall of casing 58 may be adjusted. The lifting forks 89 are carried by a transversely extending fork supporting tube 90 in front of casing 58 through which said forks project and to which they are welded on both sides. The tube 90 is secured by welding to a pair of vertically reciprocable rods 92. These rods are located mid-way between the forks of the respective pairs, so symmetrically supporting the bale. Loosely fitting aligning bearings 94 for guiding the rods 92 are secured to the front face of frame cross member 85. The upper ends of rods 92 are connected to the opposite ends of a vertically reciprocable cross beam 96. A cam lever 100 is arranged in the longitudinal plane of symmetry of the vehicle. It is fulcrumed at 102 on intermediate cross beams 103 interconnecting front vertical members 84, and connecting at its opposite end 104 with the center of fork rod cross beam 96. A vertically extending camming beam 106 is fulcrumed at 108 on the chassis cross beam 33 in the plane of symmetry of the vehicle and having at its lower end an operating connection with piston rod 136 of the motor mechanism 20, and bearing a cam follower roller 110 in its slotted upper end 112. When the lever 106 is operated through angles $a$ and $b$ (FIG. 1), in this succession, follower 110 rides over cam surfaces 114 and 115 of cam lever 100. While the lever 106 is operating through angle $a$ the cam follower 110 operates upon cam surface 114 of lever 110 to raise forks 89 from their full line position below the bottom of casing 58 past yielding dogs 68 to their dotted line position slightly above the top of the chassis and the load platform 12 and also slightly above the top of the hay dogs 68. This lifts those bales entered in casing 58 from level A to level B (FIG. 1), at which latter level they are retained by the spring re-entered dogs 68 when the forks are again lowered. The cam surface 115, when the lever 100 reaches the dotted line position of FIG. 1, lies on an arc above the lever fulcrum 108 and so no further lifting movement can ensue if the lever 106 be further oscillated through angle $b$.

For the purpose of transferring completed stacks from the bale receiving and stacking section 14 to the load-carrying platform 12, a right angular frame work having vertically and horizontally extending members 116, 118, and 120 is intervened between the fork lift mechanism just now described and the front sides of the bales. A right angular longitudinally reciprocable carriage having side and cross rails 122 and 123 is roller borne within the inwardly facing top side channels 88 of the supporting framework. This carriage carries the transfer framework 116, 118, 120 at its rear end. Angular and diagonal braces 124, 126, respectively, extend between the side rails 122 and the transfer framework just outlined. Adjustable tension springs 128 are provided between the vertical frame members 84 and the ends of the carriage side rails 122. They serve to retract the carriage and the transfer framework 116, 120 to the full line position shown in FIG. 1 following the transfer movement to the dotted line position shown, and normally hold it so retracted.

In FIG. 1 it may be seen that the upper end of slot 112 in lever 106 is closed by an end piece 130. The end 130 is provided with a somewhat rounded rear face which engages the foremost cross member 123 of carriage 122, 123 when lever 106, having reached the end of cam surface 114 of lever 100, enters upon its arc-shaped surface 115. Whenever level 106 is operated through the additional angle $b$ carriage 122, 123 is moved rearwardly from its full line to its dotted line position to carry the transfer framework depending and braced from it to the dotted line position shown in FIG. 1, thereby transferring a formed stack from stacking section 14 to the platform 12.

Unitary motor operating mechanism 20

A cylinder 134 having a piston rod 136, piston 137 (FIG. 4) and a piston rod pin 138 constitutes the basic elements of the unitary hydraulic cylinder motor 20. This motor is longitudinally arranged slightly below the bottom of the bale receiving casing 58, and like members 100 and 106 of the mechanism 18 lies in the vehicle's plane of symmetry. Pin 138 connects the piston rod permanently with the lower end of oscillating lever 106. A fixed extension 140 projects from the rear end of the cylinder 134 and carries a cross pin 142 in the same horizontal plane as the piston rod 136 and its pin connection 138 with lever 106. A pair of diverging oscillatable links 144 are carried by transversely spaced pivots 146 on chassis beam 30 from which they are swung. At their lower ends they connect with pin 142 of extension 140 of cylinder 134 and so support and transversely brace the rear end of the cylinder.

Figure 2:
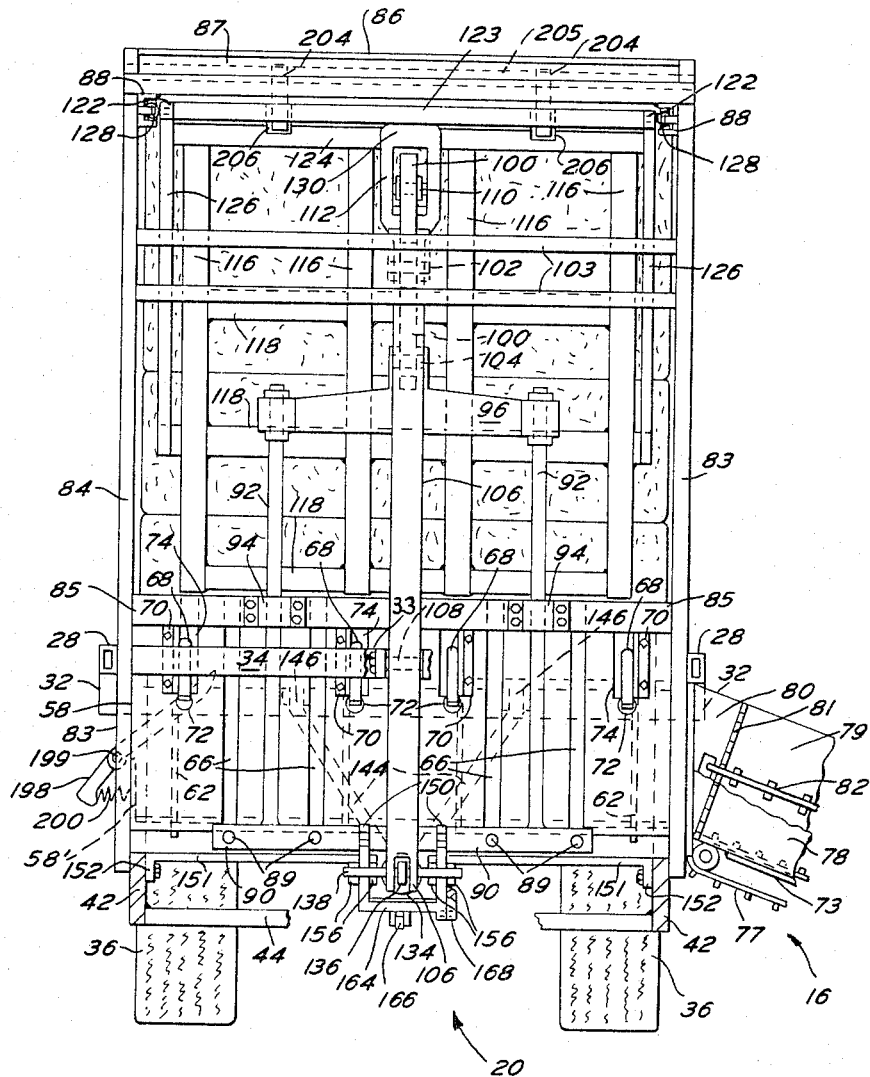
FIG. 2 is an enlarged front end elevation. In its right hand half the two foremost chassis cross members and the frontal portions of its sub-frame have been broken away in order to more clearly show parts located in the rear of these members.
Figure 3:
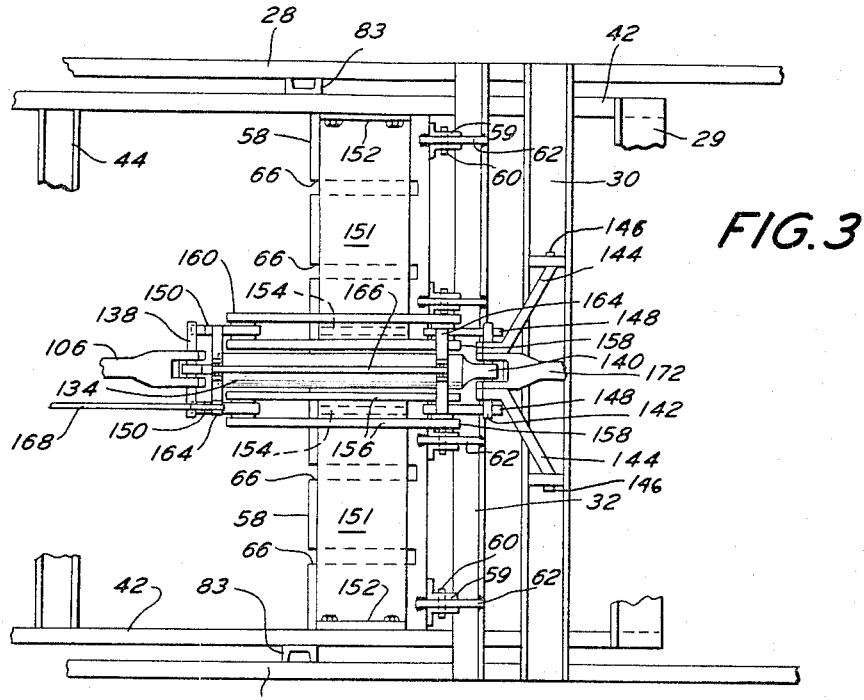
FIG. 3 is a fragmentary bottom plan view looking upwardly in the direction of arrows 3—3 applied to FIG. 1 and showing the control mechanism governing the relative functioning of the hydraulic cylinder, and its piston and piston rods.

Rear and front pairs of duplex downwardly facing deep hooks 148 and 150, respectively, are adapted to straddle the transversely extended ends of cylinder pin 142 and piston pin 138. As shown in FIGS. 2 and 3, they are located just outside of elements 106 and 144 with which the pins connect, and are spaced a little from the flanks of cylinder 134 to afford the latter clearance for its movement. These hooks serve, when they embrace the pins, to fix in longitudinal position either the cylinder 134 on the one hand or its piston 137 on the other.

The hooks 148 and 150 are pivotally supported in fixed position from the side members 42 of the sub-frame and from the underside of the casing 58 by supporting plates 151 which project horizontally inwardly from members 42 just below casing 58. Flanges 152 on plate 151 at the outer ends serve to attach the plates to the members 42. Braces 154 extend vertically between the inner ends of the plates 151 and the underside of casing 58. Pairs of narrow rails 156 flank hooks 148 and 150. The rear and front ends 158 and 160, respectively, (FIG. 3) of rails 156 carry the pivots 162 upon which hooks 148 and 150 are pivotally mounted. So long as hooks 148 are engaged with cylinder pin 142 (see FIGS. 1 and 4) and hooks 150 are disengaged from piston pin 138 as shown in full lines in FIG. 4, the piston only is free to move. It may be afforded either a movement limiting the oscillation of lever 106 to angle $a$ or a more extended movement through both angles $a$ and $b$, merely by controlling the volume of pressure fluid admitted to cylinder 134.

The ground stack erecting mechanism 22

Since the unit motor mechanism serves commonly both the stacking and transfer mechanism 18 and the ground stack erecting mechanism, certain parts of the motor mechanism necessarily also serve parts of ground stack erecting mechanism. Outstandingly, this is true of the cylinder, its piston and piston rod and the duplex extension links 144 which support the rear end of the cylinder, but, of course, a number of the other elements described enter into the erecting operation. Essential parts of the erecting mechanism 22 are the following.

Operating yokes 164 connect together the respective pairs of duplex hooks 148 and 150. A longitudinal link 166 interconnects the yokes. A link 168 extends from the forward operating yoke 164 upwardly and forwardly to an operating control position, and a bell crank lever 170 is mounted upon the fore-end of the chassis. This lever 170 has two defined positions, that in which the hooks are shown in full lines (FIGS. 1 and 4), hooks 148 being down and hooks 150, up and that shown in dotted lines (FIG. 4) in which hooks 150 embrace the piston pin 138 thereby fixing the piston with 137 against movement, while hooks 148 are raised, thereby freeing the cylinder 134 for bodily movement rearwardly with respect to the now fixed piston.

A sturdy link 172 is located in the plane of symmetry and has its lower forked end (FIG. 3) pivoting on pin 142 and embracing cylinder extension 140. Link 172 extends upwardly and rearwardly from pin 142 and has its upper end pivotally connected through a heavy pivot pin 174 (FIG. 1) with the middle pair of rails 48 of the platform 12 at a substantial radial distance forwardly of the circular chassis cross shaft 40 about which the load platform 12 is arranged to be tilted in erecting the ground stack. When hydraulic pressure is admitted to the cylinder behind its piston (the hooks 148 and 150 being in the dotted line position shown in FIG. 4) pressure forces cylinder 134 bodily rearwardly as supported by links 144, thus exerting its force through connecting rod link 172 to lift the load platform and its load and up-end it to place its stanchions 51 close to or upon the ground. During this movement the links 144 swing pin 142 on a shallow arc rearwardly to the dotted line position of FIG. 1. The pin 142 and the lower end of connecting rod 172 are moved a longitudinal distance $d$ from their original position. The tilting of platform 12 to the vertical position carries the upper pivot 174 and rod 172 an equal distance $d$ to the rear. The new position of the link 172 is parallel thus to its original position. Because the shallow arc followed by pin 142 requires pin 142 to move principally downwardly and to move but a very slight distance upwardly there is no fouling of the cylinder body with any of the parts of any of the mechanism which lie above or below it. Because there is no chassis cross beam intersecting the path of movement of connecting rod 172 (rigid cross shaft 40 lying to the rear) there is no interference with its movement.

The ground stack push off mechanism 24

When the platform 12 has been tilted up to a vertical position as indicated in phantom lines in FIG. 1, the stack of bales on platform 12 rests on stanchions 51 which now occupy a horizontal position on the ground. Mechanism must be provided to completely free the truck from the bale stack which rests on the stanchions. As in the instance of the pick-up mechanism 16, it is not intended to limit the present stack forming and erecting mechanism to the use of a particular ground stack push off means. The push off mechanism 24 shown in FIG. 1 is merely illustrative of a means to free the stack forming and erecting wagon from the stack of bales deposited on the ground.

As the wagon becomes fully loaded, the endmost vertical stack of bales is slid over a push off plate 176 extending substantially all the way across the load platform. Push off plate 176 has its rear edge welded to a series of sleeves 178 which are freely slidable over the stanchions 51. A series of hook-shaped stakes 179 are welded, one or more, to each sleeve 178 and adapted when the load is upended as shown in dotted lines, to plow into and become embedded in the soil. Stops 180 are secured to the upper ends of stanchions 51 and prevent the sleeves 178 from being slipped entirely off the stanchions as the wagon, when the stakes are fixed in the ground, pulls away to withdraw the stanchions 51 from beneath the stack. The stack remains in the position from which it is upended because push off plate 176 and sleeves 178 are fixed in position by the stakes. When sleeves 178 reach stops 180, the stanchions will be out from under the stack of bales which now rests on the ground. A slight further movement of the wagon uproots stakes 179 from the ground.

The hydraulic control system 26

Figure 4:
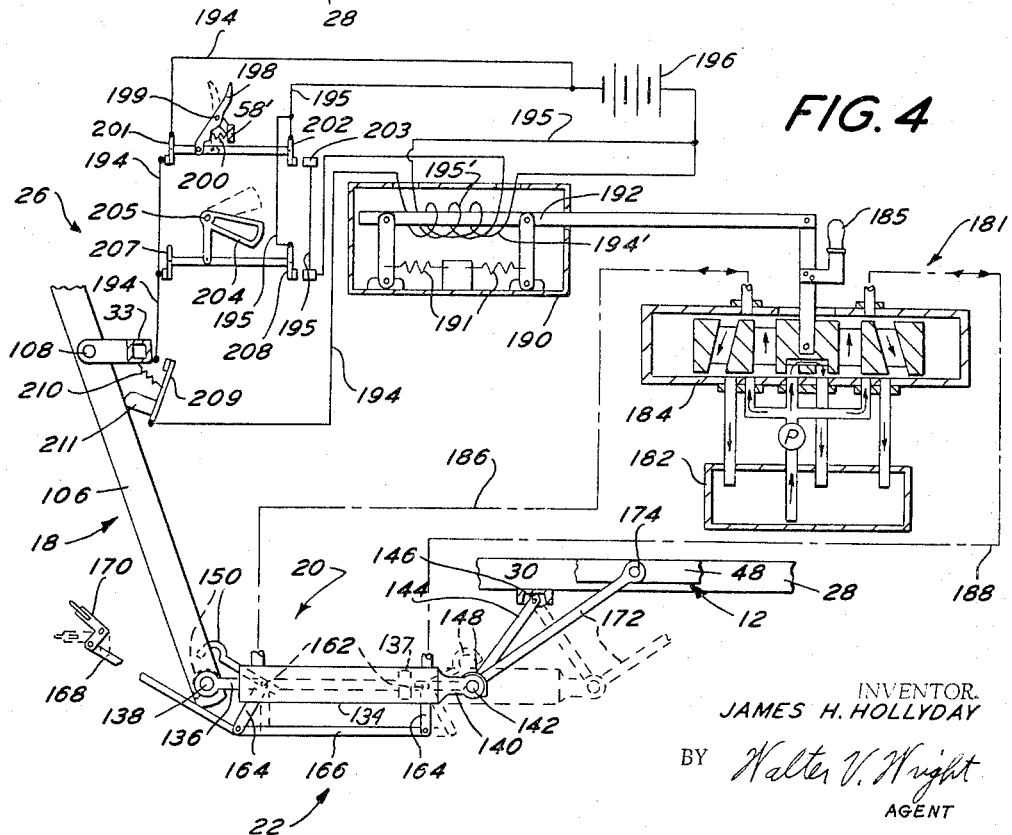
FIG. 4 is a combined diagram of the hydraulic, mechanical, and electrical control means.

This system is diagrammatically shown in FIG. 4. In conjunction with this diagram of the electric controls for the hydraulic system there are shown, the unit motor 20, a diagram of the conventional hydraulic system of a towing vehicle which powers the unit motor 20, the mechanical hook control mechanism through which movement of cylinder 134 and its piston rod 136 are controlled, and portions of the levers and links through which the cylinder and piston rod operate the lift and transfer mechanism 18 and the load carrying bed 12. Those elements, or portions of them, which have been previously described are designated by the numerals already assigned them.

The numeral 181 indicates, generally, a functionally simplified diagram of the hydraulic system of a conventional farm tractor. The system includes a fluid tank 182, a pump P and a control valve 184 having a manual control handle 185. Handle 185 has three positions: neutral (shown), left of neutral, and right of neutral.

Flexible hydraulic lines 186 and 188, respectively, extend between the forward and rear ends of cylinder 134 and valve 184.

The hydraulic system 181 and valve 184 depicted here are not intended to be a mechanically accurate illustration of any particular conventional hydraulic system. They merely serve to indicate the paths of movement of hydraulic fluid to and from cylinder 134 as related to the three positions of valve handle 185. When valve handle 185 is in the neutral position shown, fluid circulates freely from tank 182 through pump P to valve 184 and back to the tank. When handle 185 is moved to the left of neutral, fluid moves from valve 184 through line 186 to the forward end of cylinder 134 while fluid exhausts from the rear end of cylinder 134 through line 188 back to the tank 182. When handle 185 is moved to the right of neutral, fluid flows from valve 184 through line 188 to the rear end of cylinder 134 while fluid is exhausted from the forward end of cylinder 134 through line 186 to valve 184 and back to tank 182.

The numeral 190 indicates a double acting solenoid having springs 191 to automatically return to the core 192 to neutral position when both actuating circuits are opened. The solenoid is mounted on the tractor and has its core operatively connected to handle 185 of valve 184.

The two simple electrical circuits 194 and 195 along with the solenoid 190 and the several mechanical switch actuating detents to be described hereafter, consitutes the control system 26 for the tractor hydraulic system 181. A battery, or other source of electrical energy 196 provides power for circuits 194 and 195.

A bale responsive switch actuating detent 198 (see FIGS. 1 and 2 as well as FIG 4) is carried by a pivot member 199 on the half height end wall 58' of bale casing 58. A compression spring 200 between wall 58' and detent 198 normally biases the upper end of the detent into casing 58 whereby it may be engaged by the end of a bale in casing 58 to pivot the detent about member 199 to move a pair of switches 201 and 202 (FIG. 4).

The various switches and wires of the control system 26 have not been shown in FIGS. 1, 2 and 3 of the drawings. These elements are of such small size relative to the apparatus in general, that it is believed that they would not be clearly seen in FIGS. 1–3 and would only confuse these already complex figures. The diagram of FIG. 4 indicates, only symbolically, the manner in which the conventional switches of control system 26 are to be actuated by their respective actuating detents.

The switches 201 and 202, respectively, in electrical circuits 194 and 195 are actuated by detent 198 when it is displaced from its normal position by contact from a bale of hay. Switch 201 is normally closed and is opened as soon as detent 198 is moved. Switch 202 is normally open and is closed as soon as detent 198 is moved. Once switch 202 is closed, further movement of detent 198 will merely cause the movable contact to slide over the elongated fixed contact 203; the switch will remain closed. This is to render switch 202 insensitive to the normal variations in length of hay bales encountered in ordinary baling practice. When the previously described forks 89 elevate the bales in casing 58 above the upper end of detent 198, spring 200 will return the detent 198 and switches 201 and 202 to the normal positions shown in FIG. 4. It will be apparent to those skilled in the art that conventional, commercially available spring biased contact switches can readily be disposed to be actuated by detents such as 198. For example, switch 201 could be a spring-biased-to-open switch which is engaged and held closed by detent 198 when the detent is in the normal position of FIG. 1. Switch 202 could be a spring-biased-to-closed switch which is engaged and held open by detent 198 when the detent is in the normal position of FIG. 1. With such an arrangement, as soon as a bale engaged and moved detent 198, the switch 201 would open and switch 202 would close. The switches would remain this way until detent 198 returned to its normal position.

A pair of detents 204 are journalled on a cross shaft 205 carried on the rear side of the mounting frame work of stack building and transfer mechanism 18. Each detent is located above the center of one side of the stack being built. They are of a length sufficient to reach across the stacking section 14 substantially into contact with the upper end of such stacks as occupy the fore end of the carrying platform 12. (See FIG. 1.) They are raised, as each stack reaches full height, from the full line position in which the rear ends are juxtaposed to the top of the adjacent stack to steady the same, to the dotted line position in which they lie above the top of the stacks, and are returnable by gravity to their full line position, so soon as each builded stack is transferred rearwardly. In FIG. 2 it may be seen that the upper cross member 120 of the stack transfer frame and the upper horizontal angular brace 124 are slotted at 206 whereby detents 204 are clear to return to their full line position of FIG. 1 as soon as the rearwardly transferred stack of bales clears the rear end of detents 204.

A pair of switches 207 and 208, respectively in electrical circuits 194 and 195 are actuated by either one of the pair of detents 204 upon that detent being raised from its full line position toward its dotted line position. As indicated in FIG. 4, these switches are identical in operation and normal position to switches 201 and 203.

A switch 209 is in circuit 194 and is operated by previously described camming beam 106. This switch is operated so as to be open when beam 106 is in its most counterclockwise, or "home," position and to close as soon as beam 106 moves from its "home" position and to remain closed so long as beam 106 remains out of "home" position. This is symbolically indicated in FIG. 4. Switch 209 is biased toward closed position by a spring 210. Beam 106 engages switch 209 and opens it when the beam is in "home" position as indicated symbolically at 211 in FIG. 4. As soon as beam 106 pivots clockwise about its fulcrum 108, it moves away from switch 209 and spring 210 closes the switch. It will remain closed until beam 106 returns to "home" position.

*Overall operation*

Referring especially in FIGS. 1, 2 and 4, when mechanical control lever 170 is in its up position and cylinder pin 142 is in the embrace of duplex hooks 148, and piston pin 138 is free of hooks 150, the cylinder is fixed longitudinally and the stacker is ready to vertically stack bales. The first bale delivered into bale receiving casing 58 by pickup 16 rests just inside the casing. When the second bale is delivered into casing 58 it engages the first bale and moves it into engagement with switch actuating detent 198. This opens switch 201 and closes switch 202. The closing of switch 202 charges 195′ of solenoid 190 (FIG. 4) which moves handle 185 of hydraulic valve 184 to its extreme right position. This supplies hydraulic pressure to the rear face of piston 137 and oscillates camming lever 106 over cam 114 (FIG. 1) so raising the bales at level A within casing 58 past dogs 68 and slightly above level B. As soon as lever 106 begins to move from its home positions switch 209 in circuit 194 is closed. Since switch 201 in circuit 194 is now open, the closing of switch 209 produces no immediate result. As soon as the bottom of the bale in contact with detent 198 is elevated above the upper end of the detent, spring 200 returns the detent to normal position. This opens switch 202, thus breaking circuit 195, and closes switch 201 in circuit 194. When switch 201 closes, the circuit 194 is completed (switch 209 has been closed since lever 106 began to move). This completing of circuit 194 actuates coil 194′ of solenoid 190 and moves handle 185 of hydraulic valve 184 to its extreme left position. This supplies hydraulic pressure to the forward end of cylinder 134 ahead of the front face of piston 137, whereupon the piston returns to the rear end of cylinder 134 and returns lever 106 to its home position. This lowers forks 89 and the bales rest on dogs 68. When lever 106 returns home, switch 209 is opened and the solenoid is de-energized. Solenoid springs 191 center the solenoid core, thus centering hydraulic valve 184 to its neutral position wherein hydraulic fluid merely circulates from supply tank 182 to valve 184 and back to tank 182.

The above cycle is repeated each time two bales are moved into casing 58 by the pick-up mechanism 16. The lever 106 does not oscillate beyond angle *a* in FIG. 1. When, however, the top of the stack being built reaches level E (FIG. 1), by the addition of subsequent pairs of bales to the bottom of the stack, and engages detents 204, it raises them to their dotted positions which simultaneously opens switch 207 and closes switch 208 before detent 198 is freed from the bottom most bale of the stack. Thus, in this case, when detent 198 does not become free of the bottom of the stack and returns to its normal position (closing switch 201 and opening switch 202), the circuit 195 is still completed through switch 208 which has been closed by detent 204, while circuit 194 is still open at switch 207 which detent 204 has opened. Thus, coil 195′ of solenoid 190 remains energized, the core of valve 184 remains in its extreme right position, and hydraulic fluid continues to be applied to the rear of cylinder 134 behind piston 137. The stroke of hydraulic motor 134 therefore is continued, moving lever 106 through the additional angle *b* FIG. 1, carrying follower 110 over arc 115 without further movement of cam lever 100, so retaining forks 89 in their uppermost positions (shown in dotted lines in FIG. 1) for the time being. However, in moving through angle *b* the upper end 130 of lever 106 engages the front carriage cross member 123 in its center and so moves the whole carriage rearwardly, and with it depending stack transfer frame 116, 118, 120, so transferring the vertical stack in its entirety from forks 89 to the fore end of carrying platform 12. In so transferring the newly built stack all stacks previously so transferred to the platform 12 are pushed rearwardly. As the transferred stack clears detents 204, the detents are returned by gravity to the solid line position shown in FIG. 1, the switch 208 in circuit 195 is opened and switch 207 in circuit 194 is closed (since lever 106 is out of home position, switch 209 is closed). This opens circuit 195 and completes circuit 194, thus deenergizing coil 195′ and energizing coil 194′ of solenoid 190 and returning handle 185 of hydraulic valve 184 to the extreme left position. This results in the return of piston 137 to its normal position at the rear of cylinder 134 moving lever 106 back through angles *b* and *a* in succession, and once again lowering the forks 89 to the bottom of casing 58, and rendering the mechanism ready to commence the formation of the next succeeding stack.

When lever 106 reaches "home" position, switch 209 is opened, thus breaking circuit 194, whereupon the solenoid and hydraulic valve are returned to neutral by springs 191 as previously pointed out.

When the load platform 12 has been completely loaded from end to end with vertical stacks and the end most such stack has reached the retaining stanchions 51, further vertical stacking is stopped and the vehicle is moved to the location upon which it is desired to place the ground stack. Thereupon, the operator brings the vehicle to rest in that position, grasps mechanical control lever 170 and lowers it to the dotted line position (FIGS. 1 and 4) thereby releasing the rear cylinder link pin 142 from the restraint of hooks 148 and placing piston pin 138 under the restraint of hooks 150. He then grasps the manual control handle 185 of hydraulic valve 184 and moves it to the right (FIG. 4). This admits hydraulic pressure to the rear of cylinder 134 behind the piston 137. In this case, however, the piston being fixed in position by engagement of hooks 150 with piston pin 138, and cylinder body 134 being freed for movement, the application of hydraulic pressure moves the cylinder bodly rearwardly swinging its rear end first slightly downwardly as its supporting links 144 move rearwardly, and then slightly upwardly, so carrying platform raising link 172 rearwardly to its dotted line position (FIG. 1) and moving platform 12 about the fixed cross shaft 40 from its full line to its dotted line position. This up ends the load substantially to the ground, stanchions 51 only intervening between the ground surface and the stack. The withdrawal of stanchions 51 through forward movement of the vehicle has already been described. Platform 12 is returned to loading position by manual movement of valve handle 185 to extreme left position.

As previously stated this invention consists particularly of novel means for building vertical stacks, means for transferring them to the load carrying platform, and means for erecting the load to form the ground stack. Modification and change of the mechanisms invented and combined herein are also possible to those skilled in the art, and without departing from their generic spirit.

When production designing for greater loading requiring greater chassis and load platform lengths, the longitudinal location of the operating unit 20 and the longitudinal dimensions of its parts and the parts of mechanisms 18 and 22 associated with it may be readily varied to meet the conditions required, including those of load distribution and balance during all operating conditions. The relative locations of chassis main frame and sub-frame parts, particularly their cross beams are to be located to suit the requirements of the several mechanisms 18, 20 and 22 which need to be met. This present semi-diagrammatic showing of them is illustratively only of the manner of supporting these mechanisms in their present form and relative locations. Likewise the elements and arrangement of elements of the hydraulic and mechanical control system may be modified to meet other conditions.

Any and all modifications of the means invented which fall within the generic spirit of invention disclosed and set forth herein should be protected by the annexed claims.

Having thus described my invention, what I claim is:

1. A bale loading and stacking wagon comprising means adjacent the forefront of the wagon for receiving and positioning lengthwise transversely of the wagon bales introduced thereto, means for lifting bales vertically upwardly from said receiving and positioning means and forming vertically extending stacks of bales in overlying relationship to said receiving and positioning means by adding successively received and positioned bales to the bottom of the stack being formed, means transferring each stack as completed horizontally rearwardly of the region of its building, and a single motor means having two degrees of movement controlling both the lifting and the transferring means, the lifting means being effected through one of the two degrees of movement and transfer being effected through the other two degrees.

2. A bale loading and stacking wagon comprising means adjacent the forefront of the wagon for receiving and positioning lengthwise transversely of the wagon bales introduced thereto, means for lifting bales vertically upwardly from said receiving and positioning means and forming vertically extending stacks of bales in overlying relationship to said receiving and positioning means by adding successively received and positioned bales to the bottom of the stack being formed, motor means for powering said lifting means, a detent controlling the application and removal of motor power from said lifting means, which detent is bale actuated to effect the application of power and spring biased to effect its removal, and means transferring each stack as completed horizontally rearwardly of the region of its building.

3. A bale loading and stacking wagon according to claim 2 in which stack operated detent means is provided controlling the application and removal of motor power to said stack transferring means, said detent means affecting the application of power upon the completion of each stack and upon transfer of the completed stack effecting removal of motor power.

4. A loading and stacking wagon for bales of hay or like material having elongated longitudinal sides and relatively short transverse ends comprising a chassis having a front end and a rear end, wheels on said chassis supporting the chassis for movement forwardly through a field, a load-carrying platform mounted on said chassis and having a forward end disposed rearwardly of said chassis front end, means on said chassis directly in front of said load carrying platform for supporting a plurality of bales in end to end abutting relation with said elongated bale sides transverse to the direction of travel of said chassis, said bale supporting means having an opening toward one side of said chassis to receive bales, means on said chassis adjacent said opening to engage bales extending longitudinally relative to said chassis and turn and feed said bales end first transversely through said opening onto said supporting means, bale lifting means carried by said chassis in front of said forward end of said load-carrying platform for engaging bales extending transversely end to end on said supporting means and lifting said bales vertically to a position at least a bale height above and overlying said supporting means, control means actuating said lifting means to lift bales from said supporting means upwardly under the bottom of previously lifted bales to form a vertical stack of bales in overlying relation to said supporting means, the transverse extension of said stack being related to the width of said load carrying platform, means on said chassis operable to engage the forwardly disposed longitudinal sides of bales in said vertical stack and move the stack rearwardly from the lifting means to transfer it directly from said lifting means onto said load-carrying platform, and control means for actuating said stack transferring means when the vertical stack reaches a pre-determined height.

5. A loading and stacking wagon for bales of hay or like material having elongated longitudinal sides and relatively short transverse ends comprising a mobile chassis having a front end and a rear end, a load-carrying platform on said chassis, means on said chasss directly in front of said platform for supporting bales at a level lower than said platform with said elongated bale sides extending transverse to the direction of travel of said chassis, said bale supporting means having an opening toward one side of said chassis to receive bales, means on said chassis adjacent said opening to engage bales whose longitudinal sides extend in the direction of travel of said chassis and turn and feed said bales end first transversely through said opening onto said supporting means, means on said chassis for lifting said transversely extending bales vertically from said supporting means to the level of said platform and building a vertical stack of transversely extending bales overlying said supporting means by the lifting of successively received bales upwardly under previously lifted bales, and means operative in response to the building of said vertical stack of transversely extending bales to a pre-determined height to transfer said stack horizontally rearwardly from said lifting means directly onto said load-carrying platform.

6. A loading and stacking wagon for bales of hay or like material having elongated longitudinal sides and relatively short transverse ends comprising a chassis having a front end and a rear end, wheels on said chassis supporting the chassis for movement forwardly through a field, a load-carrying platform mounted on said chassis, means on said chassis for supporting bales directly in front of said load carrying platform with said elongated bale sides transverse to the direction of travel of said chassis, said supporting means having an opening toward one side of the chassis to receive bales, means carried on said chassis adjacent said opening to engage bales extending longitudinally relative to said chassis and turn and feed said bales end first transversely through said opening onto said supporting means, means for lifting said transversely extending bales vertically upwardly from said supportng means under the bottom of previously lifted bales to form a vertical stack of transversely extending bales in overlying relationship to said supporting means, and means transferring each vertical stack of transversely disposed bales, as completed, horizontally rearwardly from said lifting means directly onto said platform.

7. A loading and stacking wagon for bales of hay, or like material, having generally planar elongated longitudinal sides and relatively short transverse ends, said wagon comprising a chassis having a front end and a rear end, wheels on said chassis supporting the chassis for movement forwardly through a field, a load-carrying platform mounted on said chassis and having a forward end disposed rearwardly of said chassis front end, means on said chassis for supporting bales at a first horizontal level immediately in front of said load carrying platform with said elongated bale sides transverse to the direction of travel of said chassis, said bale supporting means having an opening toward one side of said chassis to receive bales, means on said chassis adjacent said opening to engage bales whose longitudinal sides extend in the direction of travel of said chassis and turn and feed said bales end first transversely through said opening onto said supporting means, bale lifting means carried by said chassis at said front end thereof adjacent said forward end of said load-carrying platform, said bale lifting means having a bale engaging member normally underlying bales on said supporting means and vertically movable between said first horizontal level and an overlying upper level, control means actuating said lifting means to move said bale engaging member vertically from said first level to said upper level to lift bales from said supporting means upwardly under the bottom of previously lifted bales and form a vertical stack of transversely extending bales in front of the forward end of said load-carrying platform in overlying relation to said supporting means, means on said chassis operable to engage the forwardly disposed longitudinal sides of bales in said vertical stack and transfer the stack rearwardly from said lifting means directly onto said load-carrying platform, and control means for actuating said stack transferring means when the vertical stack reaches a predetermined height.

8. The bale loading and stacking wagon as recited in claim 7 including means at said upper level for engaging and supporting bales as they are successively elevated to said upper level by said lifting means and thereby supporting said stack while the stack is being formed, said means for supporting the stack constituting a transverse series of hay dogs on each flank of the stack.

9. A loading and stacking wagon for bales of hay, or like material, having generally planar elongated longitudinal sides and transverse ends, said wagon comprising a chassis having a front end and a rear end, wheels on said chassis supporting the chassis for movement forwardly through a field, a load-carrying platform mounted on said chassis and having a forward end disposed rearwardly of said chassis front end, means on said chassis for supporting bales lengthwise transversely of the chassis at a first horizontal level adjacent the forward end of said load-carrying platform, said bale supporting means having an opening toward one side of said chassis to receive bales, means on said chassis adjacent said opening to engage bales whose longitudinal sides extend in the direction of travel of said chassis and turn and feed said bales lengthwise transversely through said opening onto said supporting means, bale lifting means carried by said chassis at said front end thereof adjacent said forward end of said load-carrying platform, said bale lifting means having a bale engaging member normally underlying bales on said supporting means and vertically movable between said first horizontal level and an overlying upper level, control means actuating said lifting means to move said bale engaging member vertically from said first level to said upper level to lift bales from said supporting means upwardly under the bottom of previously lifted bales and from a vertical stack of transversely extending bales adjacent the forward end of said load-carrying platform in overlying relation to said supporting means, means on said chassis operable to engage the forwardly disposed longitudinal sides of bales in said vertical stack and transfer the stack rearwardly onto said load-carrying platform, a single hydraulic cylinder carried by said chassis, means operatively connecting said cylinder to both the vertically acting bale lifting means and the rearwardly acting stack transferring means, and control means for actuating said stack transferring means when the vertical stack reaches a predetermined height.

10. A loading and stacking wagon for bales of hay, or like material, having generally planar elongated longitudinal sides and transverse ends, said wagon comprising a chassis having a front end and a rear end, wheels on said chassis supporting the chassis for movement forwardly through a field, a load-carrying platform mounted on said chassis and having a forward end disposed rearwardly of said chassis front end, means on said chassis for supporting bales lengthwise transversely of the chassis at a first horizontal level adjacent the forward end of said load-carrying platform, said bale supporting means having an opening toward one side of said chassis to receive bales, means on said chassis adjacent said opening to engage bales whose longitudinal sides extend in the direction of travel of said chassis and turn and feed said bales lengthwise transversely through said opening onto said supporting means, bale lifting means carried by said chassis at said front end thereof adjacent said forward end of said load-carrying platform, said bale lifting means having a bale engaging member normally underlying bales on said supporting means and vertically movable between said first horizontal level and an overlying upper level, control means actuating said lifting means to move said bale engaging member vertically from said first level to said upper level to lift bales from said supporting means upwardly under the bottom of previously lifted bales and form a vertical stack of transversely extending bales adjacent the forward end of said load-carrying platform in overlying relation to said supporting means, means on said chassis operable to engage the forwardly disposed longitudinal sides of bales in said vertical stack and transfer the stack rearwardly onto said load-carrying platform, control means for actuating said stack transferring means when the vertical stack reaches a predetermined height, means mounting said load-carrying platform on said chassis for vertical swinging movement relative thereto to erect the load into a ground stack, a single hydraulic cylinder carried by said chassis, and means operatively connecting said cylinder with each of the vertically acting bale lifting means, the rearwardly acting stack transferring means and the vertically swingable load-carrying platform to affect the required operating movement of each.

11. A loading and stacking wagon for bales of hay, or like material, having generally planar elongated longitudinal sides and transverse ends, said wagon comprising a chassis having a front end and a rear end, wheels on said chassis supporting the chassis for movement forwardly through a field, a load-carrying platform mounted on said chassis and having a forward end disposed rearwardly of said chassis front end, means on said chassis for supporting bales lengthwise transversely of the chassis at a first horizontal level adjacent the forward end of load-carrying platform, said bale supporting means having an opening toward one side of said chassis to receive bales, means on said chassis adjacent said opening to engage bales whose longitudinal sides extend in the direction of travel of said chassis and turn and feed said bales lengthwise transversely through said opening onto said supporting means, bale lifting means carried by said chassis at said front end thereof adjacent said forward end of said load-carrying platform, said bale lifting means having a bale engaging member normally underlying bales on said supporting means and vertically movable between said first horizontal level and an overlying upper level, control means actuating said lifting means to move said blae engaging member vertically from said first level to said upper level to lift bales from said supporting means upwardly under the bottom of previously lifted bales and form a vertical stack of transversely extending bales adjacent the forward end of said load-carrying platform in overlying relation to said supporting means, means on said chassis operable to engage the forwardly disposed longitudinal sides of bales in said vertical stack and transfer the stack rearwardly onto said load-carrying platform, control means for actuating said stack transferring means when the vertical stack reaches a predetermined height, means mounting said load-carrying platform on said chassis for vertical swinging movement relative thereto to erect the load into a ground stack, a single hydraulic cylinder carried by said chassis, means operatively connecting said cylinder with each of the vertivally acting bale lifting means, the rearwardly acting stack transferring means and the vertically swingable load-carrying platform to affect the required operating movement of each, and means for shifting the application of the power of said hydraulic cylinder from said bale lifting means and said stack transferring means to said vertically swingable load-carrying platform when the platform is filled to erect the load into a ground stack.

References Cited by the Examiner
UNITED STATES PATENTS

| | | |
|---|---|---|
| Re. 25,750 | 3/1965 | Adams. |
| 2,550,587 | 4/1951 | Neja _____ 214—6.2 |
| 2,586,324 | 2/1952 | Graves _____ 214—83.26 |
| 2,702,131 | 2/1955 | Leupke. |
| 2,848,127 | 8/1958 | Grey. |
| 3,054,515 | 9/1962 | Nawman _____ 214—6.2 |
| 3,159,287 | 12/1964 | Stroup. |
| 3,163,302 | 12/1964 | Pridgeon. |

GERALD M. FORLENZA, *Primary Examiner.*

M. TEMIN, J. E. OLDS, *Assistant Examiners.*